Jan. 29, 1957   D. MEEPOS ET AL   2,779,228
PLUNGER OPERATED, BALL DETENT CLEVIS PIN
Filed July 6, 1953

INVENTORS
DANIEL MEEPOS
FRANK E. ROWE
BY
*Naylor and Lassagne*
ATTORNEYS

United States Patent Office 2,779,228
Patented Jan. 29, 1957

2,779,228

PLUNGER OPERATED, BALL DETENT CLEVIS PIN

Daniel Meepos, Beverly Hills, and Frank E. Rowe, Los Angeles, Calif.; said Meepos assignor to said Rowe Application July 6, 1953, Serial No. 366,144

1 Claim. (Cl. 85—5)

The present invention relates to improvements in clevis pins of the kind used as a temporary fastening device.

In particular, the present invention relates to so-called "automatic" clevis pins which carry near their ends a lock part that can at the will of a user be moved radially of the body of the pin in a recess in the stem of the pin. This allows the pin to be inserted in a hole which snugly fits its stem, or shank. When the shank extends through such a hole, the moveable part may be moved outwardly with respect to the shank and the part may be locked in its outward position to hold the pin securely in the hole. However, such an outwardly moveable lock part is inwardly moveable in an easy manner at the will of the user so that the pin may be withdrawn from the hole.

There have ben many clevis pins devised and constructed that operate in the manner above described, but they have had drawbacks and defects such as poor strength in the stem and lock, a design which was expensive to manufacture, or a design which made the pin difficult to use. The clevis pin of the present invention is simple in construction so that it is relatively inexpensive to manufacture, easy to operate, and the lock is of a rugged and positive nature so that the pin has great holding power.

The above-mentioned defects of the prior art are remedied by the construction of a clevis pin in which there is a headed stem encompassed by a conforming tube so that the tube has an enlarged bore encompassing the head of the stem and the stem has limited longitudinal movement in the tube. Movement of the stem is limited by a handle ring having a portion extending through a slot in the stem and into the tube, while a spring inside the head of the tube and around the stem urges the stem in one direction with respect to the tube. The stem is recessed a short distance from its point so that the stem near the point forms a cam which bears upon one or more lock balls secured loosely in holes in the tube so that movement of the stem and its cam will force the balls to protrude beyond the surface of the tube or will allow the ball or balls to be retracted into the tube and below the surface thereof.

This construction is described more in detail hereinafter and is shown in the accompanying drawings, in which.

Figure 1:
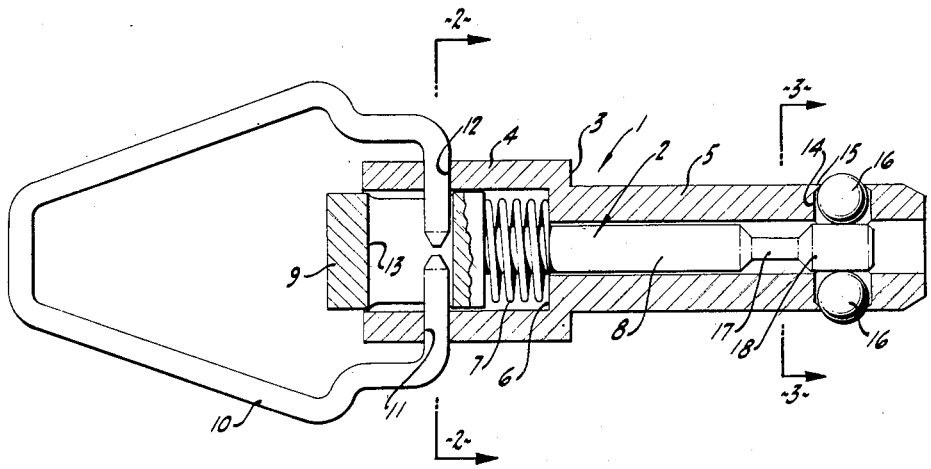
Figure 1 is a longitudinal sectional view of a clevis pin embodying a preferred form of the invention.
Figure 2:
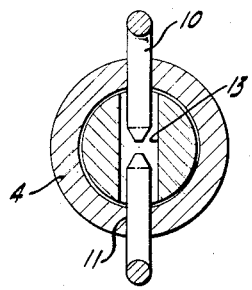
Figure 2 is a transverse sectional view on the line 2—2 of Figure 1.
Figure 3:
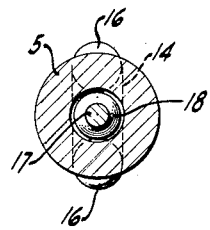
Figure 3 is a transverse sectional view on the line 3—3 of Figure 1.

The preferred form of the clevis pin shown in the drawings has two main parts. A load bearing part in the form of a tube 1, the bore of which contains and loosely conforms to the other part which is in the form of a headed stem 2 which is roughly coextensive in length with the bore of the tube 1. This conformation of the tube 1 to the headed stem forms a tube head shoulder 3 exteriorly of the tube at the juncture of the tube head 4 and the tube shank 5, and interiorly this juncture forms a seat 6. A spring 7 is placed around the portion 8 of the stem 2 so as to bear on the seat 6 and under the head 9 of the stem. The stem 2 is easily inserted in the bore of the tube 1 through the head end opening of the tube and is forced against the spring 7 to partly compress it. The stem is then retained in the tube by passing a portion of a key 10 through diametrically opposed openings 11, 12 in the head 4 of the tube and an elongated opening 13 in the head 9 of the stem. The length and the position of the stem opening 13 with respect to the tube head openings 11, 12 is such that a portion of the stem head 9 extends beyond the end of the tube, as shown, when the key 10 bears against one end of the elongated opening 13 under the urging of the spring 7, and the other end of the opening 13 is moved toward the key when pressure is exerted on the head 9. As shown in the drawings, the key 10 may be formed as a loop which may be used as a handle for the pin.

Near the point of the shank 5 of the tube 1 and in the wall of the shank are formed one or more radially positioned holes 14 which are exteriorly restricted by peening or staking the exterior of the shank adjacent each opening to form a restriction 15 at the exterior end of each hole. In each hole is placed a ball 16 that is free to move radially in its hole from a position where a portion of it protrudes beyond the exterior of the shank 5, but is prevented from further outward movement by the restriction 15 of the hole to a position where it does not protrude, and such movement of each ball is under the control of a cam which is a part of the portion 8 of the stem 2. This cam is formed by recessing or necking a portion of the stem 8 near the point of the stem and using this recess as a low part 17, or fall of the cam and the portion of the stem between the recess 17 and the tip of the stem as the high part 18, or rise, of the cam.

When the stem 2 is moved by the spring so that a part of the head of the pin extends out of the tube bore and one end of the stem opening 13 is against the key 10, the balls 16 are forced by the cam rise 18 radially outward so that a portion of each ball extends beyond the exterior of the shank 5. When the stem 2 is pressed into the tube 1, as by manual pressure, so that the free end of the stem head 9 is flush with the head end of the tube, then the low part 17 of the cam is moved adjacent the balls 16 and they may move radially so as not to protrude beyond the exterior of the shank 5. Thus when the stem 2 is pressed into the tube 1, as by pressure on the head 9 thereof, the bolt may be slid into a hole formed in one or more plates constituting a clevis and when the balls are through such plates, retraction of the stem 2 will force the balls to protrude and thereby lock the bolt in such hole.

Having thus described our invention, we claim:

A clevis pin of the character described comprising a tubular member having a bore of one diameter extending axially thereof from one end and a communicating bore of larger diameter extending axially thereof from the other end whereby an internal abutment is presented at the meeting of said bores, an external shoulder on said tubular member intermediate its ends, a stem having a portion of one diameter slidably fitting within the smaller bore of said tubular member and a portion of larger diameter slidably fitting within the larger bore of said tubular member and presenting a shoulder between the two portions thereof; said portion of larger diameter extending outwardly beyond the larger diameter end of the tubular member and thereby forming a plunger type operating means for moving said stem longitudinally within said tubular member, a coil spring compressed between said internal abutment and the shoulder of said stem, an elongated slot extending transversely through the larger diameter portion of said stem, a pair of aligned openings extending through the walls of the portion of said tubular member adjacent the end thereof having the bore of larger diameter, a bail constituting a handle for manipulation of said pin and a key for holding said tubular member and stem in assembled relationship with said spring in compressed condition; said bail extending through the openings in the wall of said tubular member and into the slot in said stem and forming a loop externally of said tubular member, at least one radial opening through the wall of said tubular member in the portion thereof having the bore of smaller diameter, a ball movably disposed in said radial opening, and cam means formed on the portion of said stem which is of smaller diameter; said cam means being effective upon depression of said plunger type operating means to allow said ball to move from a position in which a portion thereof extends beyond the periphery of said tubular member to a position in which said ball is wholly within the periphery of said tubular member, and thereafter upon release of pressure on said plunger type operating means to return said ball to a position in which a portion thereof extends beyond the periphery of said tubular member.

References Cited in the file of this patent

UNITED STATES PATENTS

| | | |
|---|---|---|
| 2,350,630 | Melcher | June 6, 1944 |
| 2,373,083 | Brewster | Apr. 3, 1945 |
| 2,515,807 | Spooner | July 18, 1950 |
| 2,724,386 | Schade | Nov. 22, 1955 |

FOREIGN PATENTS

| | | |
|---|---|---|
| 555,374 | Great Britain | Aug. 19, 1943 |